(12) United States Patent
Yasutomi et al.

(10) Patent No.: US 11,536,841 B2
(45) Date of Patent: Dec. 27, 2022

(54) SURVEYING SYSTEM AND SURVEYING METHOD

(71) Applicant: TOPCON CORPORATION, Tokyo (JP)

(72) Inventors: Satoshi Yasutomi, Tokyo (JP);
Takahiro Komeichi, Tokyo (JP);
Tadayuki Ito, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 609 days.

(21) Appl. No.: 16/567,376

(22) Filed: Sep. 11, 2019

(65) Prior Publication Data
US 2020/0103525 A1    Apr. 2, 2020

(30) Foreign Application Priority Data

Sep. 28, 2018   (JP) .............................. JP2018-185898

(51) Int. Cl.
*G01S 17/86* (2020.01)
*G01C 3/08* (2006.01)
*G01S 17/42* (2006.01)

(52) U.S. Cl.
CPC ................ *G01S 17/86* (2020.01); *G01C 3/08* (2013.01); *G01S 17/42* (2013.01)

(58) Field of Classification Search
CPC ........ G01C 3/08; G01C 15/002; G01C 15/06; G01S 17/42; G01S 7/4817
See application file for complete search history.

(56) References Cited

U.S. PATENT DOCUMENTS

| 10,340,983 | B2* | 7/2019 | Liu ........................... H04B 3/21 |
| 2016/0178406 | A1 | 6/2016 | Wang |
| 2018/0003825 | A1 | 1/2018 | Komeichi et al. |
| 2018/0224549 | A1 | 8/2018 | Yoshino et al. |
| 2019/0360806 | A1* | 11/2019 | Ohtomo ................ G01S 7/4808 |
| 2021/0033394 | A1* | 2/2021 | Sasaki ...................... G01C 3/06 |
| 2021/0080257 | A1* | 3/2021 | Ashjaee ................. G01C 15/06 |

FOREIGN PATENT DOCUMENTS

| JP | 1993-079428 U | 10/1993 |
| JP | 2000-221032 A | 8/2000 |
| JP | 2009-285778 A | 12/2009 |
| JP | 2018-4401 A | 1/2018 |

* cited by examiner

*Primary Examiner* — Mirza F Alam
(74) *Attorney, Agent, or Firm* — Thomas W. Cole; Calderon Safran & Cole P.C.

(57) ABSTRACT

A surveying system includes a target unit having a reflection target and an encoder pattern showing an angle of the target unit; a scanner configured to acquire three-dimensional point cloud data, measured coordinates of the target, and optically read the encoder pattern to acquire an encoder pattern read angle; and a leveling base configured to selectively allow either of the target unit and the scanner to be removably mounted. The scanner calculates a direction angle of the leveling base based on the encoder pattern read angle and the offset angle of the target unit, calculates coordinates of an installation point of the target unit based on the measured coordinates of the target and the direction angle of the target, and calculates a direction angle of the scanner based on the offset angle of the scanner and the direction angle of the leveling base on which the scanner is mounted.

3 Claims, 12 Drawing Sheets

SURVEYING SYSTEM AND SURVEYING METHOD

CROSS-REFERENCE TO RELATED APPLICATIONS

The present application claims priority under 35 U.S.C. § 119 to Japanese Patent Application No. 2018-185898 filed Sep. 28, 2018. The contents of this application are incorporated herein by reference in their entirely.

TECHNICAL FIELD

The present invention relates to a surveying method, more specifically, to a surveying system using a ground-installed laser scanner, a scanner device, a target unit, and a surveying method.

BACKGROUND ART

A ground-installed scanner device is mounted on a tripod, and used to grasp three-dimensional shapes of terrain and features by acquiring three-dimensional observation data including three-dimensional point cloud data of a measuring object by rotationally irradiating laser pulsed light via a scanning unit, scanning the measuring object, and performing a distance measurement and an angle measurement by each pulsed light.

Point cloud data obtained with the ground-installed scanner device is in a coordinate system centered at the scanner. Therefore, to integrate point cloud data obtained at a plurality of observation points, the acquired point cloud data need to be converted into a common absolute coordinate system. Therefore, it is necessary to measure absolute coordinates and direction angles of the scanner device at the observation points (for example, Paragraph 0008, etc., in Patent Literature 1).

For this, a backward intersection method and a method using a backsight point and an instrument point are available, and general procedures of these methods are as follows.

When using a backward intersection method:
1. Install reflection targets at two or more known points.
2. Install a ground-installed scanner at a location where point cloud data are observed.
3. Target-scan each reflection target, and measure a distance and a direction angle to each target.
4. Observe (full-dome scan) point cloud data.
5. Install the ground-installed scanner at a location (new point) where point cloud data are newly observed.
6. Install the reflection targets at new known points as necessary.
7. Repeat steps 3. to 6. described above.
8. Obtain respective instrument point coordinates and instrument direction angles by the backward intersection method, and convert respective point cloud observation data into coordinate values in a coordinate system used for the known points.

When using a backsight-point-and-instrument-point method:
1. Install a reflection target at a backsight point (known point), and install a ground-installed scanner at an instrument point (being a known point and a location where point cloud data are observed).
2. Install a reflection target at a location (new point) where point cloud data are observed next.
3. Respectively target-scan the reflection target at the backsight point and the reflection target at the new point, and measure distances and direction angles to the targets.
4. Observe (full-dome scan) point cloud data.
5. Install the ground-installed scanner at the new point described in step 2.
6. Install a reflection target at the last instrument point as a backsight point.
7. Repeat steps 2. to 6. described above.
8. Obtain instrument point coordinates (known) and a direction angle at the first backsight point, and successively obtain instrument point coordinates and instrument direction angles, and convert point cloud observation data at each instrument point into coordinate values in a coordinate system used for the known points.

CITATION LIST

Patent Literature

[Patent Literature 1] Japanese Published Unexamined Patent Application No. 2018-004401

SUMMARY OF INVENTION

Technical Problem

However, in these methods, when a next observation point (new point) is set, it is necessary to install reflection targets at two or more known points in the backward intersection method and a reflection target at a known point being a backsight point a backsight-point-and-instrument-point method, in addition to install a reflection target at the new point, and then perform target scanning.

A time necessary for target scanning is approximately 2 minutes for one reflection target, and this becomes a factor of an increase in time necessary for the overall observation operation.

Further, with the conventional methods, particularly in an environment such as an indoor environment having a large number of walls, etc., obstructing the vision, the following problems occur. In the backward intersection method, when preparing two or more known points in a range viewable from a new instrument point in advance, fewer known points can be shared, the known point setting operation increases, and the operation becomes troublesome.

In the backsight-point-and-instrument-point method, a next instrument point (new point) must always be set in a range from which a backsight point is viewable, so that a ground-installed scanner cannot be installed at a location optimum for observation in some cases, so that the number of observations needs to be increased to acquire necessary data, and the operation becomes troublesome.

The present invention was made in view of the above-described circumstances, and an object thereof is to provide a surveying system capable of determining a new point, less or without performing measurement of a known point or a backsight point in a survey using a ground-installed scanner.

Solution to Problem

In order to solve the above-described problems, a surveying system according to an aspect of the present invention includes: a target unit including a reflection target and an encoder pattern showing an angle in a circumferential direction around a central axis of the target unit; a scanner device including a distance measuring unit configured to perform a distance measurement by transmitting distance measuring light and receiving reflected light, a scanning unit configured to rotationally irradiate the distance measuring light onto a measurement range, and an angle detector configured to detect an irradiation direction of the distance measuring light, so as to acquire point cloud data and acquire measured coordinates of the reflection target by performing target scanning, the scanner device including an encoder pattern reading unit configured to optically read the encoder pattern, and an arithmetic control unit configured to operate an encoder pattern read angle based on a result of encoder pattern reading; and a leveling base configured to selectively allow either of the target unit and the scanner device to be removably mounted so as to share a central axis in the vertical direction, and having offset angles, being known, around the central axis with respect to each of the target unit and the scanner device when the target unit or the scanner device is mounted, wherein the arithmetic control unit calculates a direction angle of the leveling base based on the encoder pattern read angle of the target unit installed by mounting on the leveling base and the offset angle of the target unit, and calculates coordinates of an installation point of the target unit based on the measured coordinates of the reflection target of the target unit installed by mounting on the leveling base and the direction angle, and the arithmetic control unit calculates a direction angle of the scanner device based on the offset angle of the scanner device and the direction angle of the leveling base on which the scanner device is mounted.

A scanner device according to another aspect of the present invention includes: a distance measuring unit configured to perform a distance measurement by transmitting distance measuring light and receiving reflected light; a scanning unit configured to rotationally irradiate the distance measuring light onto a measurement range; an angle detector configured to detect an irradiation direction of the distance measuring light; and an encoder pattern reading unit configured to optically read an encoder pattern provided in a target unit, the target unit including a reflection target and removably mounted on a leveling base so as to share a central axis in the vertical direction, and the encoder pattern showing an angle in a circumferential direction around the central axis of the target unit; and an arithmetic control unit, and the scanner device removably mounted on the leveling base so as to share the central axis in the vertical direction, wherein the leveling base has offset angles, around the central axis when the scanner device or the target unit is mounted, and the offset angles being known, the arithmetic control unit acquires point cloud data and operates measured coordinates of the reflection target by target-scanning the reflection target, operates the encoder pattern read angle from a result of reading of the encoder pattern of the target unit mounted on the leveling base, and based on the encoder pattern read angle and the offset angle of the target unit, operates a direction angle of the leveling base, calculates coordinates of an installation point of the target unit based on measured coordinates of the target unit installed by mounting on the leveling base and the direction angle, and calculates a direction angle of the scanner device based on the offset angle of the scanner device and the direction angle of the leveling base on which the scanner device is mounted.

A target unit according to another aspect of the present invention includes a reflection target and an encoder pattern showing an angle in a circumferential direction around a central axis of the target unit, and is configured to be removably mounted on a leveling base so as to share a central axis in the vertical direction, and configured to be, in a mounted state on the leveling base, positioned in a circumferential direction around the central axis and have an offset angle, being known, around the central axis.

A surveying method according to another aspect of the present invention includes the steps of:(a) a scanner device calculating a direction angle of the scanner device based on an offset angle $\theta_S$ of the scanner device around a vertical central axis with respect to a leveling base, the scanner device mounted on the leveling base installed at a position $P_i$ whose coordinates and direction angle are known; (b) the scanner device scanning, at the point $P_i$, a reflection target of a target unit mounted on the leveling base installed at a point $P_{i+1}$ to be observed next, and operating measured coordinates of the reflection target; (c) the scanner device reading an encoder pattern of the target unit installed at the point $P_{i+1}$, and operating an encoder pattern read angle $\theta_E$ based on a result of reading; (d) the scanner device operating a direction angle of the leveling base at the point $P_{i+1}$ based on the encoder pattern read angle $\theta_E$ and an offset angle $\theta_T$ of the target unit around the vertical central axis with respect to the leveling base; (e) the scanner device operating coordinates of the point $P_{i+1}$ based on the direction angle of the leveling base at the $P_{i+1}$ and the measured coordinates; (f) the scanner device moving the scanner device to the point $P_{i+1}$ whose coordinates and direction angle became known through the steps (a) to (e), when there is a point to be observed next; and (g) the scanner device repeating the steps (a) to (e) by setting i=i+1 after the step (f). The target unit includes the reflection target and the encoder pattern, the encoder pattern shows an angle in a circumferential direction of the central axis around the target unit, the leveling base is configured to selectively allow either of the target unit and the scanner device to be removably mounted so as to share a central axis in the vertical direction, and the offset angle of the target unit and the offset angle of the scanner device are respectively known.

It is also preferable that the surveying method includes (h) a step, performed by the scanner device, of acquiring point cloud data of a measurement range, at a point whose coordinates and direction angle became known by using the surveying method according to the aspect described above.

In this description, the term "encoder pattern" is a pattern having angle information in which a reference point is set to 0°. This pattern may include not only a pattern detectable by natural light but also a pattern detectable by polarized light.

Benefit of Invention

According to the configuration described above, in a survey using a ground-installed scanner, a new point can be determined less or without performing observation of a known point or a backsight point.

DESCRIPTION OF EMBODIMENTS

Preferred embodiments of the present invention are described with reference to the drawings. In the following description of the embodiments, the same components are provided with the same reference signs, and overlapping description is omitted. In each drawing, components are enlarged and schematically illustrated as appropriate for convenience of description, and which may not reflect actual ratios.

Embodiments

1. Overall Configuration of Surveying System

Figure 1:
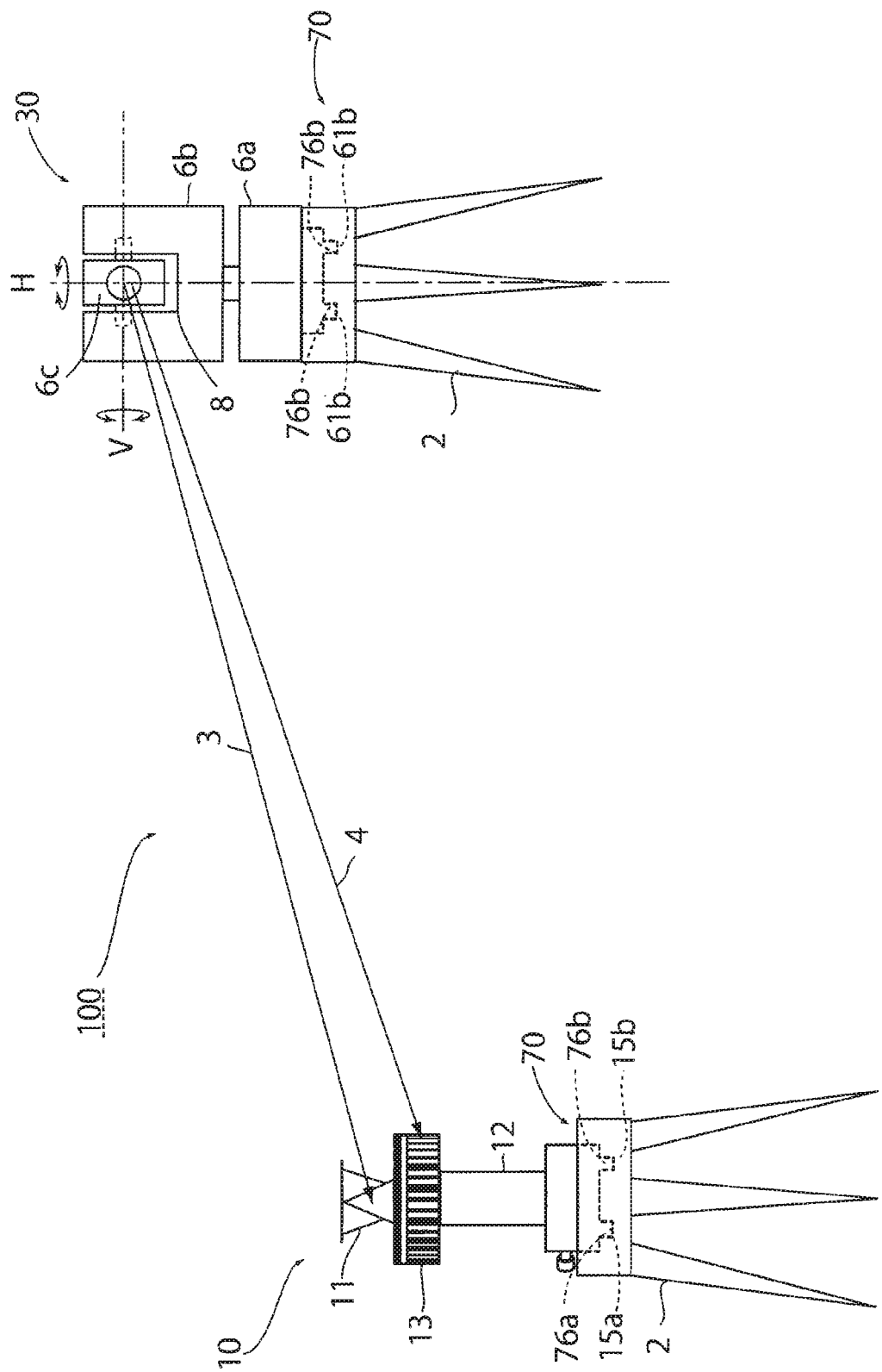
FIG. 1 is a configuration schematic view of a surveying system according to an embodiment of the present invention.

FIG. 1 is a view illustrating a schematic configuration of a surveying system 100 to carry out a surveying method according to an embodiment of the present invention. The surveying system 100 includes a target unit 10, a scanner device 30, and a leveling base 70.

2. Configuration of Target Unit

Figure 2:
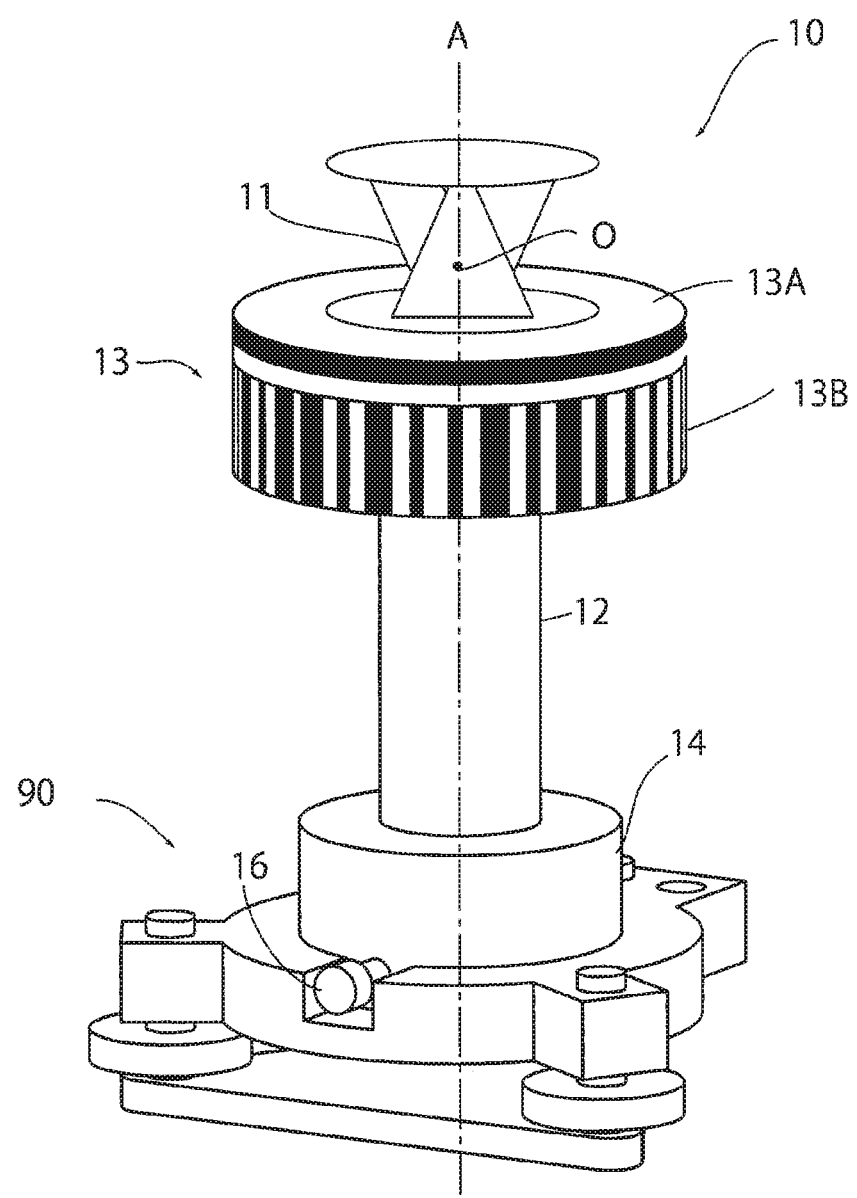
FIG. 2 is a perspective view illustrating a state where a target unit according to the same embodiment is fitted to a leveling base.

As illustrated in FIG. 2, the target unit 10 includes a reflection target 11, a support member 12, an encoder pattern portion 13, and a base portion 14, and is removably mounted on the leveling base 70 mounted on a tripod 2, and held vertically.

The reflection target 11 is a so-called 360-degree prism configured by, for example, radially combining a plurality of triangular pyramid prisms, and reflects light made incident from its entire circumference (360°) toward directions opposite to the incident directions. That is, the reflection target 11 reflects distance measuring light from the scanner device 30 toward the scanner device 30. The reflection target 11 is not limited to the 360-degree prism, and a normal prism to be used for a survey may be used.

The support member 12 is, for example, a columnar member made of metal or resin, extending upward so as to have a fixed length from the base portion 14. The support member 12 fixes and supports the encoder pattern portion 13 and the reflection target 11 so that a central axis A of the support member passes through a center $O_E$ (FIG. 3A) (of a base 13A) of the encoder pattern portion 13. A central axis of the base 13A and the central axis A of the support member 12 that are common to each other are configured to pass through the center O of the reflection target 11. That is, the central axis A of the support member 12 is a central axis of the target unit 10.

The encoder pattern portion 13 is configured by providing an encoder pattern 13B on a side circumferential surface of the base 13A that is in a short columnar shape. The base 13A is fixed between the support member 12 and the reflection target 11 by a method such as, for example, screwing a threaded portion (not illustrated) formed on an outer circumference of the support member to a screw hole (not illustrated) formed at a center of the base 13A.

The encoder pattern 13B includes an angle information portion 131 and a width information portion 132 above and adjacent to the angle information portion 131.

Figure 3A:
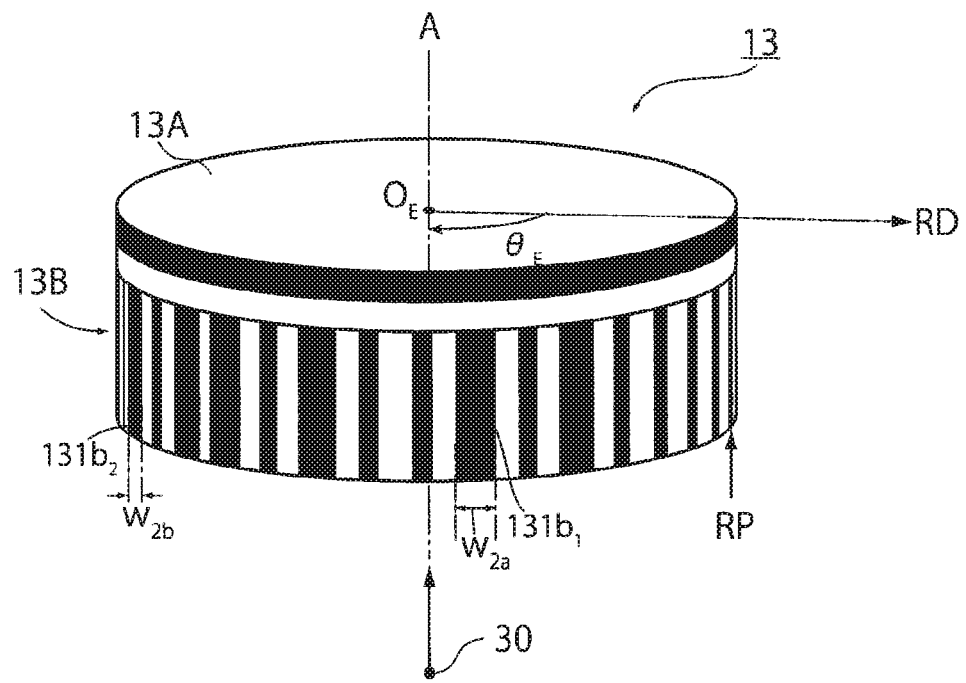
FIG. 3A is an enlarged perspective view of an encoder pattern portion of the target unit in the same embodiment.
Figure 3B:
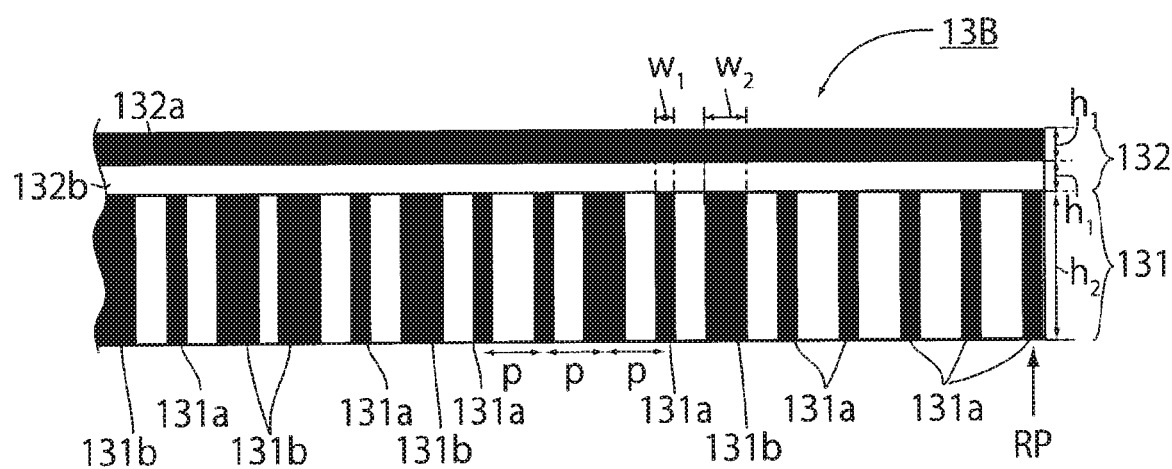
FIG. 3B is a view (partially omitted) of an encoder pattern of the encoder pattern portion, cut open at a reference point and planarly developed.

As illustrated in FIG. 3A and FIG. 3B, the angle information portion 131 is a barcode-like pattern formed by disposing, for example, narrow-width black vertical lines 131a with a width $w_1$ and wide-width black vertical lines 131b with a width $w_2$ at even pitches p on a white background by defining the vertical lines 131a as "0" and the vertical lines 131b as "1" so as to generate an M-sequence recurring random number code. The encoder pattern 13B is configured so that, by setting a direction RD from the center of the encoder pattern portion 13 to a reference point RP (hereinafter, referred to as a "reference direction of the encoder pattern") as 0°, an angle (hereinafter, referred to as an "encoder pattern read angle") $\theta_E$ calculated from the pattern read by the scanner device corresponds to an absolute angle in a clockwise circumferential direction around the central axis A of the support member 12, from the reference direction RD of the encoder pattern 13B.

The angle information portion 131 is configured so as to realize desired resolution by changing a bit number.

The bit pattern is not limited to the M-sequence code, and bit patterns such as a gray code and a pure binary code can be used, and these can be generated by a publicly known method. However, use of the M-sequence code is advantageous because it enables an increase in bit number without increasing tracks in number, and realizes high resolution with a simple configuration.

The width information portion 132 includes a black zone 132a with a predetermined height $h_1$ and a white zone 132b with the same height. The black zone 132a and the white zone 132b respectively extend across the entire circumference of the encoder pattern portion 13 in the circumferential direction.

The encoder pattern 13B can be provided in the encoder pattern portion 13 by various publicly known methods that are used for forming patterns. The encoder pattern 13B may be provided by, for example, printing on a white sheet by a method of general printing, such as inkjet printing, and sticking the sheet onto the side circumferential surface of the base 13A. According to this method, the encoder pattern portion 13 can be formed by an extremely inexpensive and simple method. The encoder pattern 13B may be provided by being directly printed on a resin-made base 13A. Alternatively, the encoder pattern 13B may be provided on a metal-made base 13A by a method such as painting or vapor deposition, etc.

In the illustrated example, the width information portion 132 is disposed above and adjacent to the angle information portion 131. However, the positional relationship between the angle information portion 131 and the width information portion 132 is not limited to this, and the width information portion 132 may be disposed below the angle information portion 131.

The encoder pattern portion 13 is disposed below and adjacent to the reflection target 11. However, the positional relationship between the encoder pattern portion 13 and the reflection target 11 is not limited to this, and other dispositions are possible as long as the encoder pattern portion 13 is disposed to be coaxial with the central axis A of the support member 12 passing through the center O of the reflection target 11.

That is, the encoder pattern portion 13 may be disposed above the reflection target 11. The encoder pattern portion 13 and the reflection target 11 may be disposed away from each other.

The base portion 14 is, for example, a columnar member made of metal or resin, which is larger in diameter than the support member 12, and provided coaxially with the support member 12, and has dimensions matching a base mounting hole 74 of the leveling base 70. On a bottom surface of the base portion 14, engagement projections 15a, 15b, and 15c (FIG. 7) that respectively engage with engagement holes 76a, 76b, and 76c of the leveling base 70 as described later are provided at three positions at even intervals in the circumferential direction with respect to the central axis A of the support member 12.

On a side circumferential surface of the base portion 14, a positioning projection 16 is provided so as to project in a radial direction.

3. Configuration of Scanner Device

Figure 4:
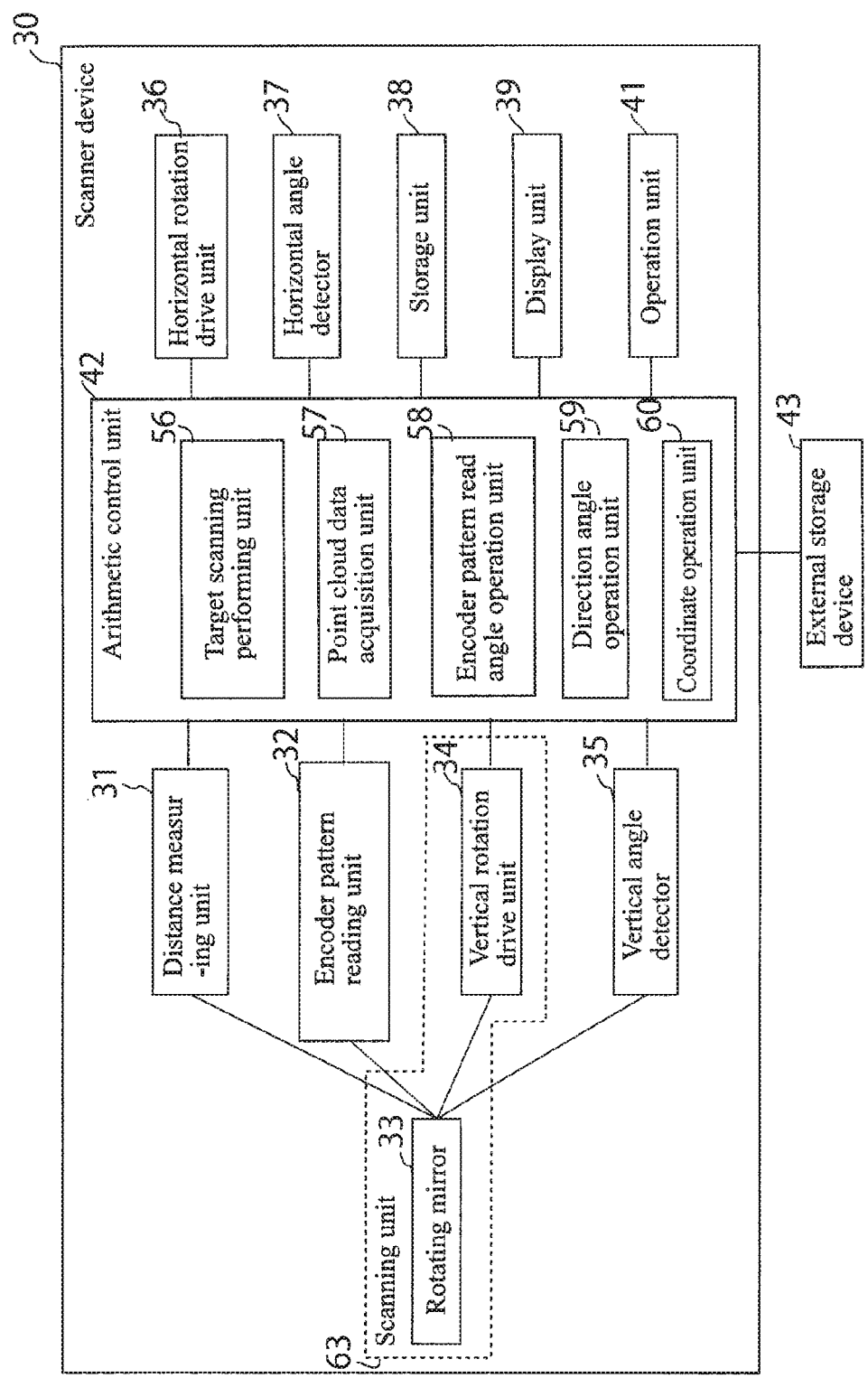
FIG. 4 is a configuration block diagram of a scanner device according to the same embodiment.

FIG. 4 is a configuration block diagram of the scanner device 30. The scanner device 30 is a so-called laser scanner, and includes a distance measuring unit 31, an encoder pattern reading unit 32, a rotating mirror 33, a vertical rotation drive unit 34, a vertical angle detector 35, a horizontal rotation drive unit 36, a horizontal angle detector 37, a storage unit 38, a display unit 39, an operation unit 41, an arithmetic control unit 42, and an external storage device 43.

In appearance, as illustrated in FIG. 1, the scanner device 30 is installed via the leveling base 70 mounted on a tripod 2, in the same manner as the target unit 10. The scanner device 30 includes a base portion 6a to be removably mounted on the leveling base 70, a bracket portion 6b provided to be horizontally rotatable 360° around an axis H-H, and a telescope portion 6c provided to be vertically rotatable around an axis V-V in a concave portion 8 of the bracket portion 6b.

In the base portion 6a, the horizontal rotation drive unit 36 and the horizontal angle detector 37 that detects a rotation angle around the axis H-H of horizontal rotation are housed. The horizontal rotation drive unit 36 is, for example, a motor, and the horizontal angle detector 37 is, for example, a rotary encoder. The horizontal rotation drive unit 36 rotates the bracket portion 6b around the axis H-H of horizontal rotation, and the horizontal angle detector 37 detects a rotation angle of the bracket portion 6b around the axis H-H of horizontal rotation with respect to the base portion 6a, and outputs a detection signal to the arithmetic control unit 42.

A bottom portion of the base portion 6a has the same configuration as that of a bottom portion of the base portion 14 of the target unit 10. That is, the bottom portion is shaped in a columnar shape matching the base mounting hole 74 of the leveling base 70, and the base portion 6a is provided, on its bottom surface, with engagement projections 61a, 61b, and 61c (refer to FIG. 8C) having shapes matching engagement holes 76a, 77b, and 76c of the leveling base 70. On a side circumferential surface of the bottom portion of the base portion 6a, a positioning projection 62 is provided.

In the bracket portion 6b, the vertical rotation drive unit 34, the vertical angle detector 35, the storage unit 38, and the arithmetic control unit 42 are provided. The display unit 39 and the operation unit 41 are provided outside the bracket portion 6b.

The vertical rotation drive unit 34 is a motor, and is provided on an axis V-V of vertical rotation. The telescope portion 6c is configured to rotate 360 degrees in the vertical direction in response to rotation of the vertical rotation drive unit 34. The vertical angle detector 35 is, for example, a rotary encoder. The vertical angle detector 35 is provided on an axis V-V of vertical rotation, and detects a rotation angle around the axis V-V and outputs a detection signal to the arithmetic control unit 42.

In the telescope portion 6c, the distance measuring unit 31 and the encoder pattern reading unit 32 are housed. Inside the telescope portion 6c, a lens barrel (not illustrated) including the rotating mirror 33 is provided, and an axis of horizontal rotation of the lens barrel is coaxial with the axis H-H of horizontal rotation of the bracket portion 6b. The lens barrel is mounted in the telescope portion 6c by a proper means.

Figure 5:
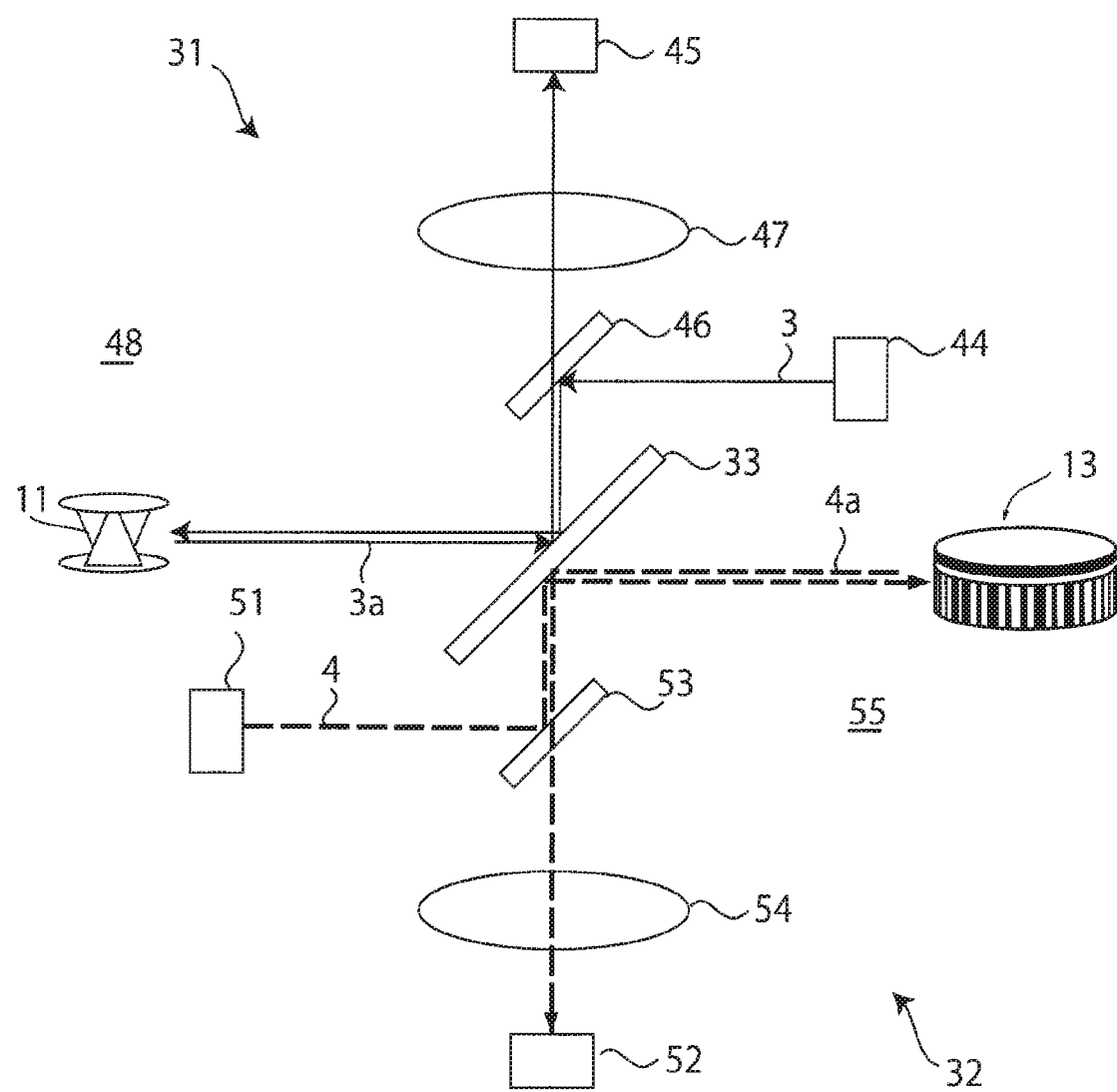
FIG. 5 is a schematic view describing a mechanism for light transmission and reception in a distance measuring unit and an encoder pattern reading unit of the scanner device according to the same embodiment.

FIG. 5 is a view describing a mechanism for light transmission and reception of a distance measuring light 3 and a encoder pattern reading light 4 in the distance measuring unit 31 and the encoder pattern reading unit 32 of the present embodiment. The distance measuring unit 31 includes a distance measuring light transmission and receiving optical system 48 including a distance measuring light transmission unit 44, a distance measuring light receiving unit 45, a beam splitter (not illustrated), a distance measuring light mirror 46, a distance measuring light condenser lens 47, and the rotating mirror 33. The distance measuring light transmission unit 44 includes a light emitting element (not illustrated).

The light emitting element is, for example, a semiconductor laser or the like, and emits a pulsed laser beam as distance measuring light 3. The emitted distance measuring light 3 is reflected by the distance measuring light mirror 46, and further reflected by the rotating mirror 33 and irradiated onto a measuring object. The rotating mirror 33 is a double-sided mirror, and is driven by the vertical rotation drive unit 34 to rotate around a vertical rotation axis V-V. Therefore, the rotating mirror 33 and the vertical rotation drive unit 34 constitute a scanning unit 63 to scan the distance measuring light. The rotating mirror 33 is, for example, a perforated double-sided mirror having a rectangular or circular plate shape, but is not limited to this.

The distance measuring light 3a retroreflected by the measuring object enters the distance measuring light receiving unit 45 through the rotating mirror 33, the distance measuring light mirror 46, and the distance measuring light condenser lens 47. The distance measuring light receiving unit 45 is a light receiving element, for example, a photodiode, etc. A portion of the distance measuring light split by the above-described beam splitter enters the distance measuring light receiving unit 45 as internal reference light (not illustrated), and based on the reflected distance measuring light 3a and the internal reference light, a distance to an irradiation point is obtained by the arithmetic control unit 42.

By cooperation of a rotation of the rotating mirror 33 in the vertical direction and a r rotation of the bracket portion 6b in the horizontal direction, two-dimensional scanning with the distance measuring light is performed. Distance measurement data for each pulsed light is acquired by the distance measuring unit 31, and angle measurement data for each pulsed light is acquired by the vertical angle detector 35 and the horizontal angle detector 37. Full-dome scanning is performed by rotating 270° including a vertex in the vertical direction and rotating 360° in the horizontal direction, and thus, three-dimensional point cloud data of the measurement range are acquired.

On the other hand, the encoder pattern reading unit 32 includes a reading light transmission and receiving optical system 55 including a reading light transmission unit 51, a reading light receiving unit 52, a reading light mirror 53, and a reading light condenser lens 54. The reading light transmission unit 51 includes a light emitting element (not illustrated), and emits a light beam with a wavelength different from that of the distance measuring light 3, for example, a visible light, etc., as the encoder pattern reading light 4. The emitted encoder pattern reading light 4 is reflected by the reading light mirror 53. The encoder pattern reading light is further reflected by the rotating mirror 33 and irradiated onto the encoder pattern 13B. The reflection of the reading light 4 is performed by a surface of the rotating mirror 33 on the reverse side of a surface that reflects the distance measuring light 3.

Then, the reading light 4*a* reflected by the encoder pattern 13B enters the reading light receiving unit 52 through the rotating mirror 33, the reading light mirror 53, and the reading light condenser lens 54. The reading light receiving unit 52 is a light receiving element, for example, an avalanche photodiode, etc. A light receiving signal input into the reading light receiving unit 52 is output as a received light amount distribution to the arithmetic control unit 42.

The storage unit 38 is, for example, a hard disk drive, and stores various programs for activating the scanner device 30. For example, the storage unit stores 38 programs such as a sequence program to perform a distance measurement and an angle measurement, a point cloud data measurement program for acquiring point cloud data by driving the scanning unit to rotationally irradiate distance measuring light and performing operations of distance and angle measurements for each point, a target scanning program for scanning a periphery of the target and operating coordinates of the reflection target 11, an encoder pattern read angle operation program for reading the encoder pattern and operating an encoder pattern read angle $\theta_E$, a direction angle operation program for operating a direction angle based on the encoder pattern read angle $\theta_E$, and a coordinate operation program for operating coordinates of the scanner device 30 on the basis of measured coordinates of the reflection target 11 and a direction angle of the scanner device, etc. In addition, the storage unit 38 stores correlations between bit patterns represented by encoder patterns and angles, for example, in a table format.

The display unit 39 is, for example, a liquid crystal display or the like, and displays operation status data and measurement results, etc., obtained by the arithmetic control unit 42.

The operation unit 41 is a touch display, a keyboard, or the like, and inputs operation commands into the scanner device.

The arithmetic control unit 42 is, for example, a microcontroller including a CPU, a ROM, and a RAM, etc., mounted on an integrated circuit. The arithmetic control unit 42 is electrically connected to the distance measuring unit 31, the encoder pattern reading unit 32, the vertical rotation drive unit 34, the vertical angle detector 35, the horizontal rotation drive unit 36, the horizontal angle detector 37, the storage unit 38, the display unit 39, and the operation unit 41.

Into the arithmetic control unit 42, angle detection signals from the vertical angle detector 35 and the horizontal angle detector 37 are input, and light receiving signals from the distance measuring light receiving unit 45 and the reading light receiving unit 52 are input. In addition, a signal from the operation unit 41 in response to an operator's operation is input.

The arithmetic control unit 42 drives the distance measuring light transmission unit 44, the reading light transmission unit 51, the vertical rotation drive unit 34, and the horizontal rotation drive unit 36, and controls the display unit 39 that displays an operation status and measurement results, etc.

The arithmetic control unit 42 includes, as functional units, a target scanning performing unit 56 that performs target scanning to measure a distance and an angle by intensively irradiating distance measuring light onto a peripheral range around the reflection target, and calculates measured coordinates of the reflection target from the distance measurement and angle measurement data, a point cloud data acquisition unit 57 that acquires point cloud data of the measurement range by operating results of the distance measurement and angle measurement performed for each point by rotationally irradiating distance measuring light onto the measuring object (range), an encoder pattern read angle operation unit 58 that operates an encoder pattern read angle $\theta_E$ from a result of encoder pattern reading, a direction angle operation unit 59 that operates a direction angle based on an offset angle $\theta_T$ of the target unit 10, an offset angle $\theta_S$ of the scanner device 30, and the encoder pattern read angle $\theta_E$, and a coordinate operation unit 60 that operates coordinates of a new point in a map coordinate system based on the measured coordinates of the reflection target 11 and the distance angle of the scanner device 30.

The external storage device 43 is, for example, a memory card, a hard disk drive, a USB memory, or the like, and may be fixed to or may be removably provided in the arithmetic control unit 42. The external storage device 43 stores reflection target measurement data, point cloud data, angle measurement data, and encoder pattern read data, etc.

4. Configuration of Leveling Base

Figure 6A:
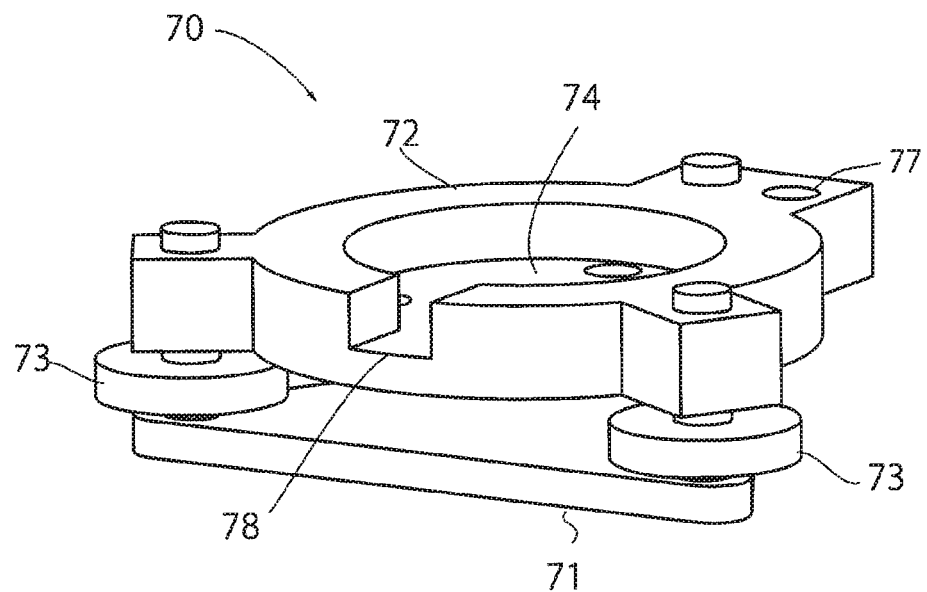
FIG. 6A is a perspective view of a leveling base according to the same embodiment.

The leveling base 70 is a pedestal on which either the target unit 10 or the scanner device 30 is selectively mounted, and has an automatic leveling function. The leveling base 70 is formed mainly of, as illustrated in FIG. 6A, a tripod mounting seat portion 71 to be mounted on a tripod, a leveler main body 72, and three leveling screws 73 joining the tripod mounting seat portion 71 and the leveler main body 72.

The leveler main body 72 includes a tilt sensor, a leveling screw drive mechanism, and a control unit, etc., which are not illustrated, and is configured to adjust the leveling screws 73 by automatically controlling the drive mechanism based on tilt posture information of the tilt sensor so that the leveler main body 72 becomes horizontal. As an automatic control mechanism of the leveler main body 72, a publicly known configuration can be used as appropriate, so that detailed description of the automatic control mechanism is omitted. In addition, the leveler main body 72 is provided with a level 77 to check a level state.

Figure 6B:
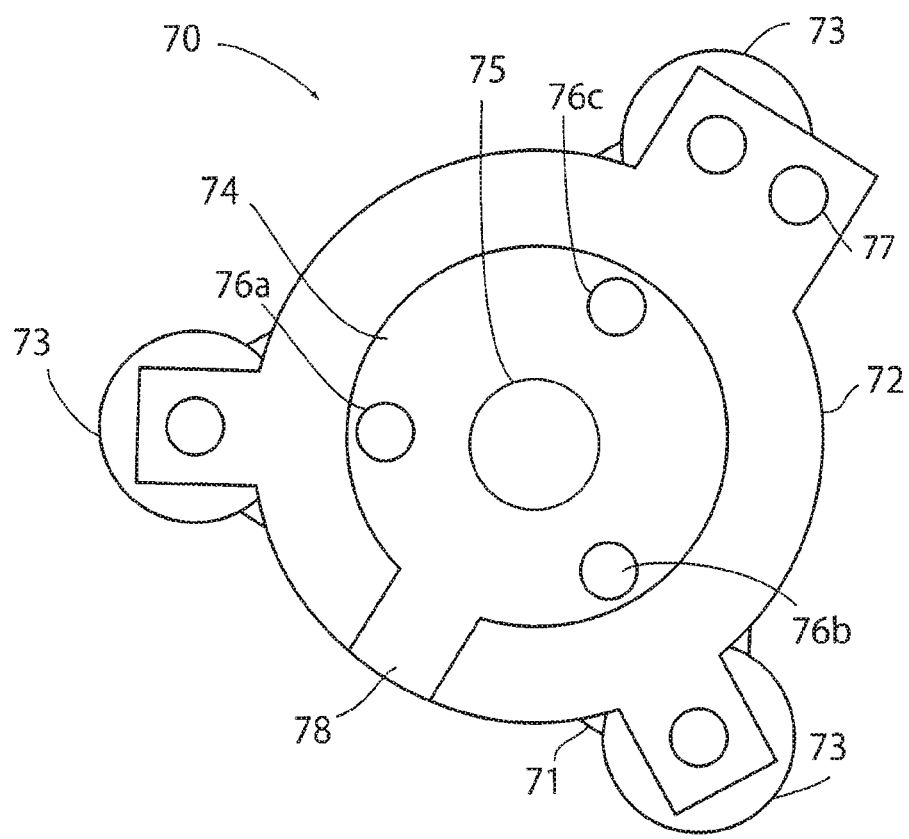
FIG. 6B is a plan view of the same leveling base.

As illustrated in FIG. 6B, in an upper surface of the leveler main body 72, a base mounting hole 74 for mounting the target unit 10 or the scanner device 30 is opened. In the base mounting hole 74, three engagement holes 76*a*, 76*b*, and 76c are provided at intervals of 120° in a circumferential direction around an installation position 75 of a laser centripetal device (not illustrated) provided at a central portion of the base mounting hole 74. At a portion of an outer rim portion of the leveler main body 72, a fitting groove 78 is formed.

Figure 7:
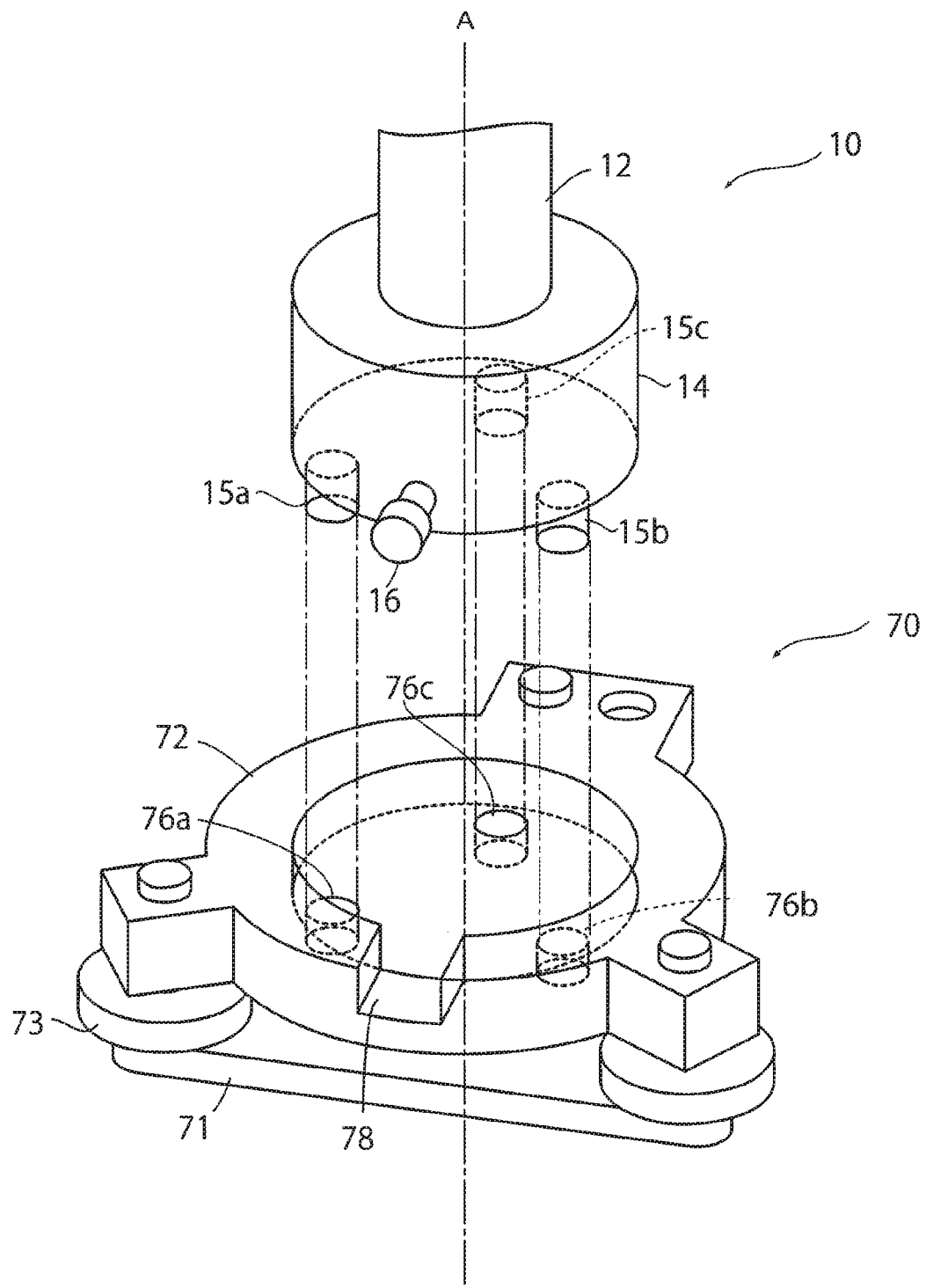
FIG. 7 is a view describing a mounting structure of the target unit to the leveling base of the same embodiment.

As illustrated in FIG. 7, the target unit 10 is positioned in the circumferential direction by the engagement holes 76a, 76b, and 76c and the fitting groove 78, and mounted on the leveling base 70 so as to share a central axis in the vertical direction. The target unit 10 is removably locked to the leveling base 70 by pressing one engagement projection 15a by a plate spring locking mechanism not illustrated.

A mounting structure of the scanner device 30 onto the leveling base 70 is also the same as the mounting structure of the target unit 10.

Figure 8A:
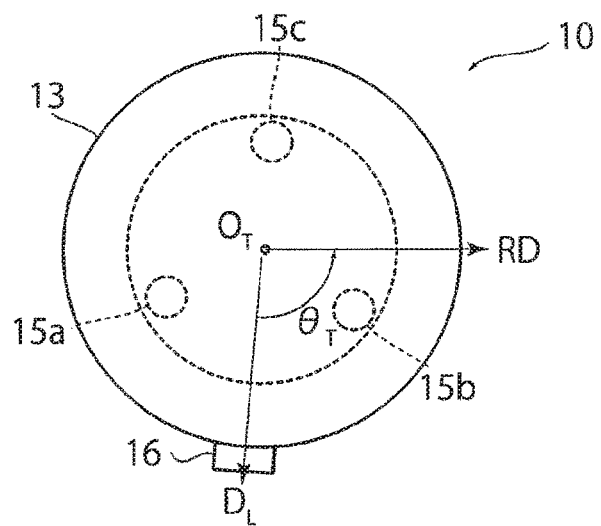
FIG. 8A, FIG. 8B and FIG. 8C are views illustrating the target unit, the leveling base, and the scanner device, respectively, and the manner in which they cooperate according to the same embodiment.
Figure 8B:
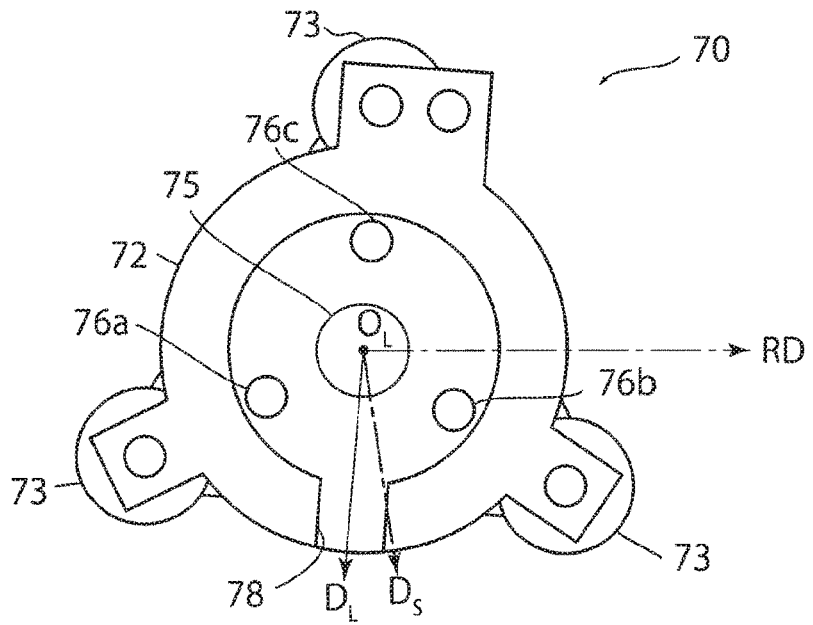
Figure 8C:
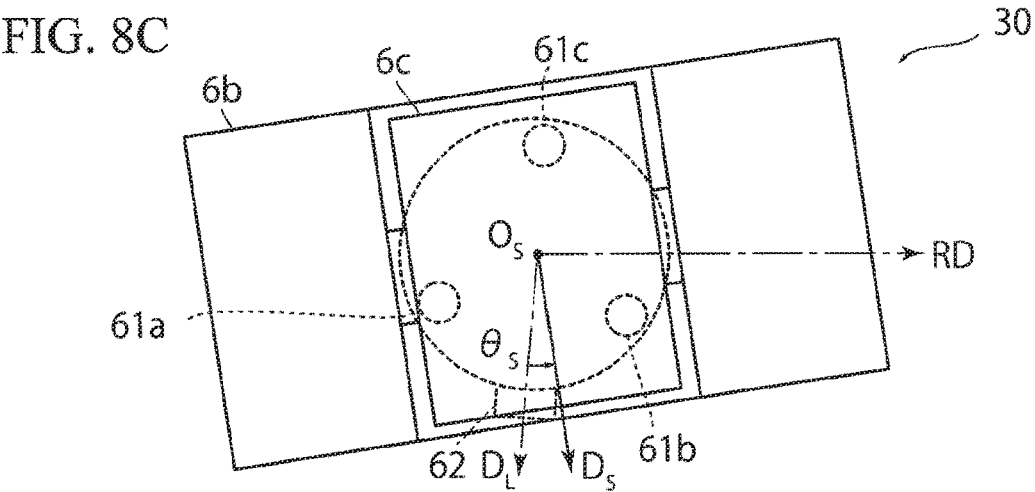

As a result, when the target unit 10 is mounted on the leveling base 70 in the state illustrated in FIG. 8B, the reference direction RD of the encoder pattern portion 13 (that is, the target unit 10) deviates by an angle $\theta_T$ (hereinafter, referred to as an "offset angle $\theta_T$ of the target unit 10") counterclockwise in the circumferential direction from a reference direction $D_L$ of the leveling base 70 (hereinafter, referred to as a "direction $D_L$ of the leveling base 70") (FIG. 8A). In FIG. 8A to FIG. 8C, the reference signs $O_T$, $O_L$, and $O_S$ respectively denote the centers of the target unit 10, the leveling base 70, and the scanner device 30.

Similarly, when the scanner device 30 is mounted on the leveling base 70 in the state illustrated in FIG. 8B, a reference direction $D_S$ of the scanner device 30 (hereinafter, referred to as a "direction $D_S$ of the scanner device 30") deviates by a predetermined angle $\theta_S$ (hereinafter, referred to as a "offset angle $\theta_S$ of the scanner device 30") counterclockwise in the circumferential direction from the direction $D_L$ of the leveling base 70 (FIG. 8C).

Here, clockwise angles relative to the north of the reference direction RD of the target unit 10, the direction $D_S$ of the scanner device 30, and the direction $D_L$ of the leveling base 70 are respectively a direction angle of the target unit 10, a direction angle of the scanner device 30, and a direction angle of the leveling base 70.

The offset angle $\theta_T$ of the target unit 10 and the offset angle $\theta_S$ of the scanner device 30 are known in advance through measurement or design, and stored in the storage unit 38. When the scanner device 30 is installed at a known point and reads an encoder pattern read angle $\theta_E$ in a state where the direction angle is set to a known value α, the encoder pattern read angle $\theta_E$ can be expressed by a function of α. Therefore, a direction angle of the leveling base 70 can be obtained based on the encoder pattern read angle $\theta_E$ and the offset angle $\theta_T$ of the target unit 10. Further, when the direction angle of the leveling base 70 is obtained, based on the offset angle $\theta_S$ of the scanner device 30, a direction angle of the scanner device 30 mounted on the leveling base 70 can be obtained.

The above-described settings of the direction $D_L$ of the leveling base 70 and the direction $D_S$ of the scanner device 30 are examples in the present embodiment, and as described above, by performing positioning in the circumferential direction by using the fitting groove 78 and the engagement holes 76a, 76b, and 76c of the leveling base 70 and setting a horizontal angle around the central axis A to a predetermined angle, the reference direction RD of the encoder pattern portion 13, the direction $D_L$ of the leveling base 70, and the direction $D_S$ of the scanner device 30 can be set to have a definite relationship.

The relationships in the vertical direction between the reflection target 11 of the target unit 10 and the scanner device 30; and the leveling base 70 are respectively fixed. And the positional relationships in the vertical direction are known. Thus, by obtaining central coordinates of the reflection target 11 mounted on the leveling base 70, so that coordinates of the leveling base 70 are obtained. Based on the coordinates of the leveling base 70, coordinates of the scanner device 30 mounted on the leveling base 70 are also obtained.

Figure 9:
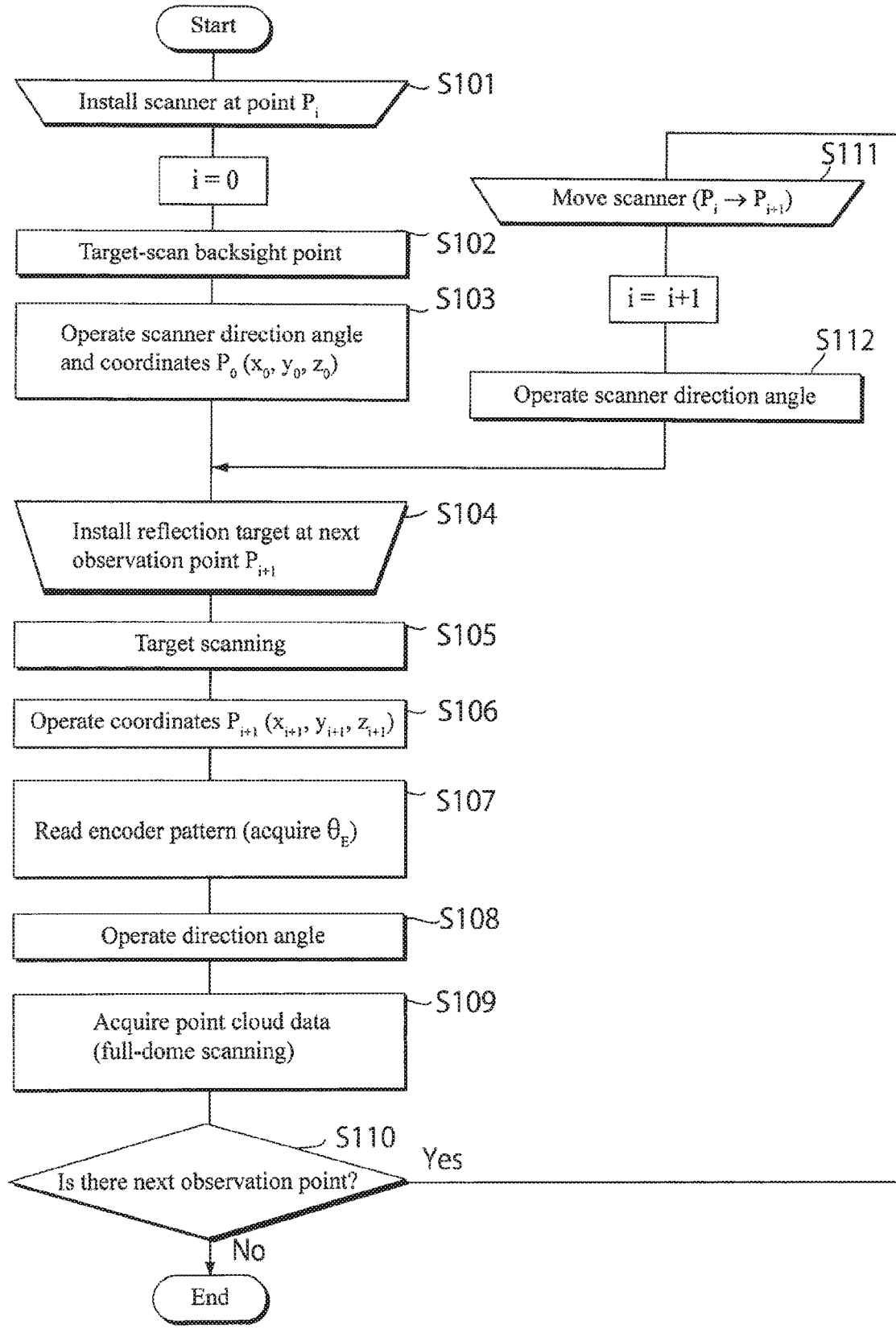
FIG. 9 is a flowchart of an example of point cloud data observation using the surveying system according to the same embodiment.

5. Survey of Observation Point and Observation of Point Cloud Data 5-1. Entire Operation FIG. 9 is a flowchart of a survey of an observation point and observation of point cloud data performed by using the surveying system 100 according to the present embodiment.

A case of observation of point cloud data in each of the spaces illustrated in FIG. 10A to FIG. 10D is described by way of example. In the figures, a black triangle denotes a known point, a white circle denotes an observation point being a new point, a black circle denotes an observation point whose coordinates were obtained through measurement, and a black star denotes a point at which point cloud data have been completely acquired (full-dome scanned). At each point, the leveling base 70 mounted on a tripod is installed in advance. English letters T and S attached to each point respectively show which of the target unit 10 or the scanner device 30 is mounted on the leveling base 70 at each point. An arrow means that the reflection target 11 installed at an end point of the arrow was target-scanned by the scanner device 30 installed at a start point.

Values of the offset angle $\theta_T$ of the target unit 10 and the offset angle $\theta_S$ of the scanner device 30 are known in advance through measurement or design and stored in the storage unit 38. Coordinates and a direction angle of the leveling base installed at a first observation point $P_0$ are to be obtained by a backsight-point-and-instrument-point method.

Figure 10A:
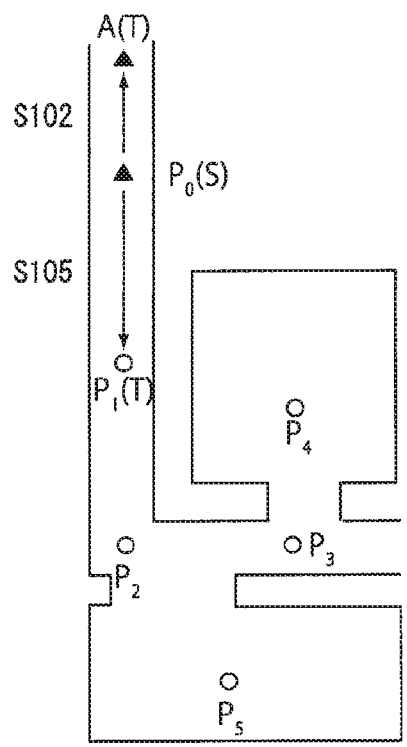
FIG. 10A, FIG. 10B, FIG. 10C and FIG. 10D are views each describing a disposition of the scanner device and the target unit in the example of point cloud data observation described above.

When starting observation, first, in Step S101, the scanner device 30 is mounted on the leveling base 70 installed at the first observation point $P_0$ ($x_0$, $y_0$, $z_0$) being a known point. At this time, the target unit 10 is installed at a backsight point A (FIG. 10A).

Next, in Step S102, the reflection target 11 at the backsight point A is target-scanned with the scanner device 30, and measured coordinates of the reflection target 11 are acquired.

Next, in Step S103, the arithmetic control unit 42 operates a direction angle of the scanner device at the point $P_0$ and coordinates $P_0$ ($x_0$, $y_0$, $z_0$) in a map coordinate system.

Steps S101 to S103 are the same as in a conventional method, and these steps may be performed by a backward intersection method, that is by preparing two or more known points and setting a point whose coordinates are unknown as a first observation point, without limiting to a backsight-point-and-instrument-point method. In this case, in Step S102, the known points are target-scanned, and in Step S103, based on a result of the target scanning, a direction angle of (the scanner device 30 installed at) the first observation point $P_0$ is operated, and coordinates in a map coordinate system are operated.

Next, in Step S104, an operator mounts the target unit 10 (reflection target 11) on the leveling base 70 installed at a new point $P_1$ to be a next observation point, and inputs that fact from the operation unit.

Next, in Step S105, the reflection target 11 installed at the point $P_1$ is target-scanned with the scanner device 30, and measured coordinates of a center of the reflection target 11 are acquired.

Next, in Step S106, the coordinate operation unit 60 operates coordinates ($x_1$, $y_1$, $z_1$) in the map coordinate system of (the scanner device 30 at) the point $P_1$ based on a result of the target scanning of the point $P_1$ and the direction angle of the point $P_0$.

Next, in Step S107, the scanner device 30 reads the encoder pattern 13B, and operates an encoder pattern read angle $\theta_E$. Details of the reading of the encoder pattern 13B are described later.

Next, in Step S108, the direction angle operation unit 59 operates a direction angle of the leveling base 70 at the point $P_1$ based on the encoder pattern read angle $\theta_E$ and the offset angle $\theta_T$ of the target unit 10.

Next, in Step S109, the scanner device 30 performs a point cloud data acquisition mode, and performs full-dome scanning.

Next, in Step S110, the scanner 30 determines whether or not there is a point to be measured next.

When there is a point to be measured next (Yes), in Step S111, the operator removes the target unit 10 from the leveling base 70 at the point $P_1$, and mounts the target unit 10 on the leveling base 70 at the next observation point $P_2$. The target unit 10 at the point $P_2$ may be a new target unit. At this time, the scanner device 30 may display a message, etc., prompting the operator to move the scanner device on the display unit 39.

In Step S111, when the operator inputs completion of the movement with the operation unit, the scanner device 30 sets i=2 as instrument point information and shifts the processing to Step S112, and operates a direction angle of the scanner device 30 based on the direction angle of the leveling base 70 acquired in Step S108 and the offset angle $\theta_S$ of the scanner device 30. At this time, it is also possible that operation of the direction angle of the leveling base 70 in Step S108 is omitted, and a direction angle of the scanner device 30 is directly operated from the encoder pattern read angle $\theta_E$, the offset angle $\theta_T$ of the target unit 10, and the offset angle $\theta_S$ of the scanner device 30.

Figure 10B:
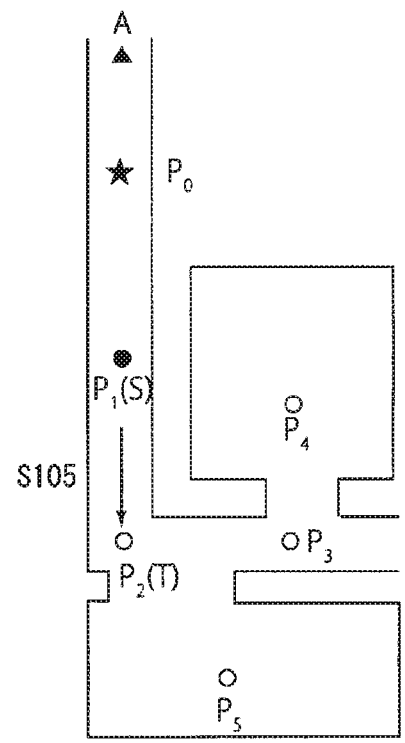

Next, the processing returns to Step S104 (FIG. 10B). Here, the operator mounts the target unit 10 on the leveling base 70 at the point $P_2$, and inputs that fact into the scanner.

Figure 10C:
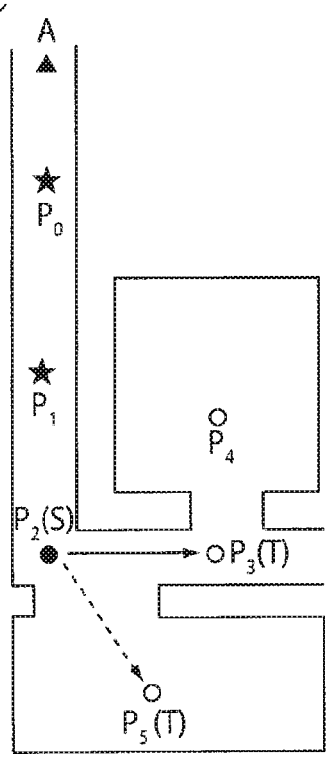
Figure 10D:
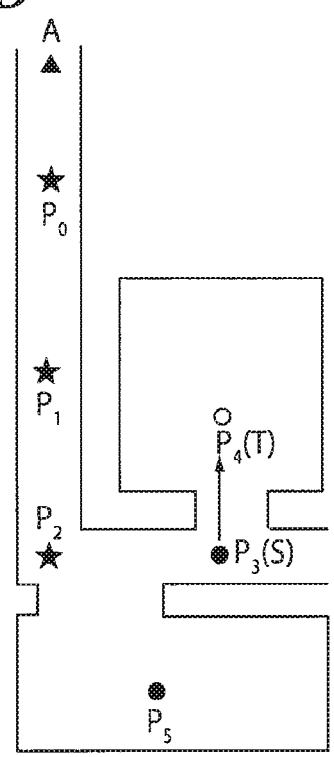

Thus, until it is determined that there is no longer a next observation point in Step S110, Steps S111, S112, and S104 to S110 are repeated, and the measurement is advanced for points $P_2$ and $P_3$ as illustrated in FIG. 10C and FIG. 10D.

Then, when there is no next observation point in Step S110 (No), the observation is ended.

The direction angles and coordinate data, etc., obtained through target scanning, full-dome scanning, encoder pattern reading, and various arithmetic operations, are stored in the storage unit 38 in association with information on observation points, or output to the external storage device 43. Alternatively, a configuration is also possible in which the scanner device 30 is provided with a communication unit, and these data are transmitted to an external data processing device such as a personal computer.

After the point cloud data at each observation point, the coordinate data at each observation point, and the direction angle data of the scanner device 30 are transferred into the external data processing device, the point cloud data are converted into an absolute coordinate system, and through registration processing, three-dimensional shape data are obtained.

As illustrated in FIG. 10C, it is also possible that, at the point $P_2$, a plurality of target units 10 are used and respectively installed at the point $P_3$ and point $P_5$, and after coordinates and a direction angle of the point $P_3$ are acquired, subsequently, coordinates and a direction angle of the point $P_5$ are acquired as illustrated by the dashed line.

According to the surveying system of the present embodiment, in a state where coordinates and a direction angle become known, by acquiring coordinates of a new point by target scanning, and acquiring an encoder pattern read angle, a direction angle of the leveling base at the new point can be acquired and a direction angle of the scanner device mounted on the leveling base can be acquired without target scanning of a backsight point or a known point. Therefore, except for the first observation point, there is no need to target-scan a backsight point or known point to obtain coordinates and a direction angle of a new point, so that the time required for the survey can be shortened.

For example, when a survey in each space illustrated in FIG. 10A to FIG. 10D is assumed, according to the conventional backsight-point-and-instrument-point method, observation of a backsight point at each point is necessary, so that target scanning needs to be performed 11 times (twice for each of the points $P_0$, $P_1$, and $P_3$, three times for the point $P_2$, and once for each of the point $P_4$ and $P_5$). However, according to the present embodiment, target scanning is performed only 6 times. Therefore, the time required for target scanning can be shortened, and as a result, the time required for the entire observation can be shortened.

To obtain coordinates and a direction angle of a new point, there is no need to target-scan a backsight point or known point, and this is advantageous in an indoor space that has poor visibility such as in FIG. 10A to FIG. 10D.

This is because, for example, when a survey in a space as illustrated in FIG. 10A to FIG. 10D by a conventional backward intersection method is assumed, it is difficult to prepare two or more known points for each new point. To prepare two or more known points, observation points need to be increased, and observation point setting becomes troublesome, and the time required for the entire observation increases. On the other hand, according to the present embodiment, only visibility between a new point and a next new point is required, and there are fewer restrictions in preparation of new points. Therefore, there is no need to perform a known point setting operation and an observation operation more than necessary.

Moreover, as described above, according to the surveying system of the present embodiment, acquisition of point cloud data by the scanner device installed at an observation point whose coordinates and a direction angle are known is particularly advantageous because this enables efficiently performing the entire observation of point cloud data.

5-2. Encoder Pattern Reading

Figure 11:
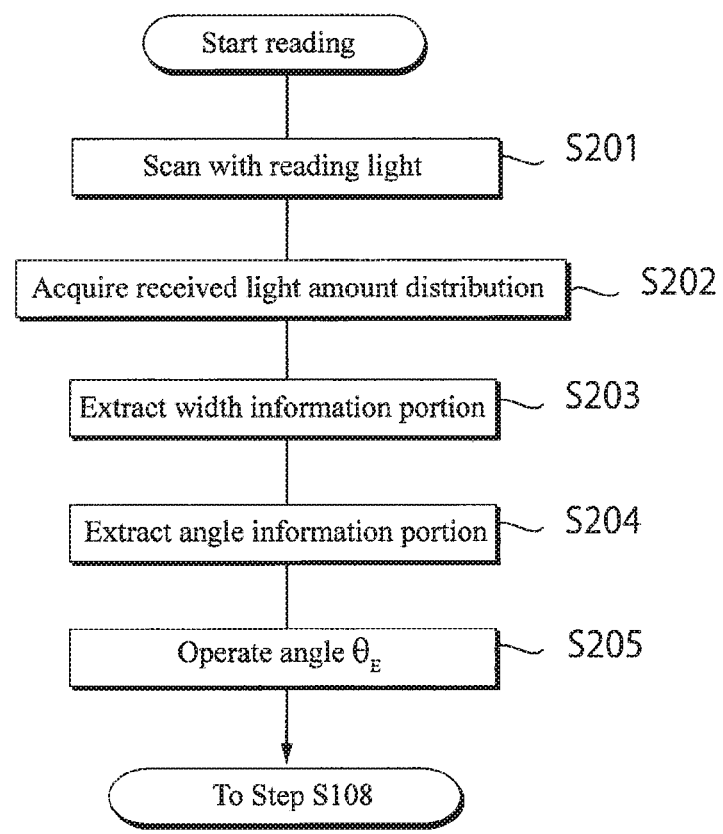
FIG. 11 is a flowchart of encoder pattern reading in the same point cloud data observation.

Here, the reading of the encoder pattern 13B in Step S107 is described with reference to FIG. 11, FIG. 12A and FIG. 12B.

Figure 12A:
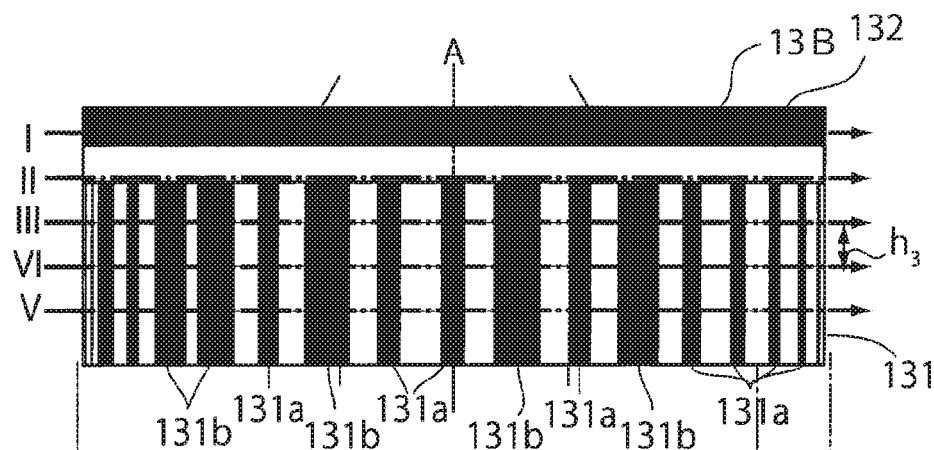
FIG. 12A is a view describing a scanning position of the encoder pattern by the scanner device of the same embodiment.

When starting encoder pattern reading, in Step S201, under control of the arithmetic control unit 42, the reading light transmission unit 51 transmits a reading light 4 to scan a periphery of the encoder pattern portion 13 at intervals of, for example, a height $h_3$ as illustrated in FIG. 12A.

The arithmetic control unit 42 sets scanning conditions based on distance measurement data of the reflection target 11 acquired in Step S105 and known dimensions of the encoder pattern portion 13.

For example, a height $h_3$ set to be, for example, shorter than the height $h_1$ of the black zone 132a and the white zone 132$b$ of the width information portion 132 (FIG. 3B) and shorter than a half $h_2/2$ of the height $h_2$ of the vertical lines 131$a$ and 131$b$ (FIG. 3B) is preferable because this height $h_3$ enables reliable scanning of both of the width information portion 132 and the angle information portion 131.

Next, in Step S202, the reading light reflected by the encoder pattern 13B is received by the reading light receiving unit 52, and a light receiving signal is output as a received light amount distribution to the arithmetic control unit 42. Light reflected by a black portion of the encoder pattern is received as weak light and light reflected by a white portion is received as intense light, so that in the received light amount distribution, the value becomes small at a black portion, and becomes large at a white portion. Therefore, the received light amount distributions at respective positions I to V in FIG. 12A are, for example, as illustrated in FIG. 12B.

Next, in Step S203, from the received light amount distributions acquired in Step S202, results of reading of the width information portion 132 are extracted. In detail, a region corresponding to a received light amount smaller than a predetermined threshold is determined as a black portion, a region corresponding to a received light amount larger than the predetermined threshold is determined as a white portion, and a region in which at least one of the black portion and the white portion continues for a length corresponding to a diameter L of the encoder pattern portion calculated from the result of target scanning acquired in Step S105 and known dimensions of the encoder pattern portion, is determined as the width information portion 132.

Figure 12B:
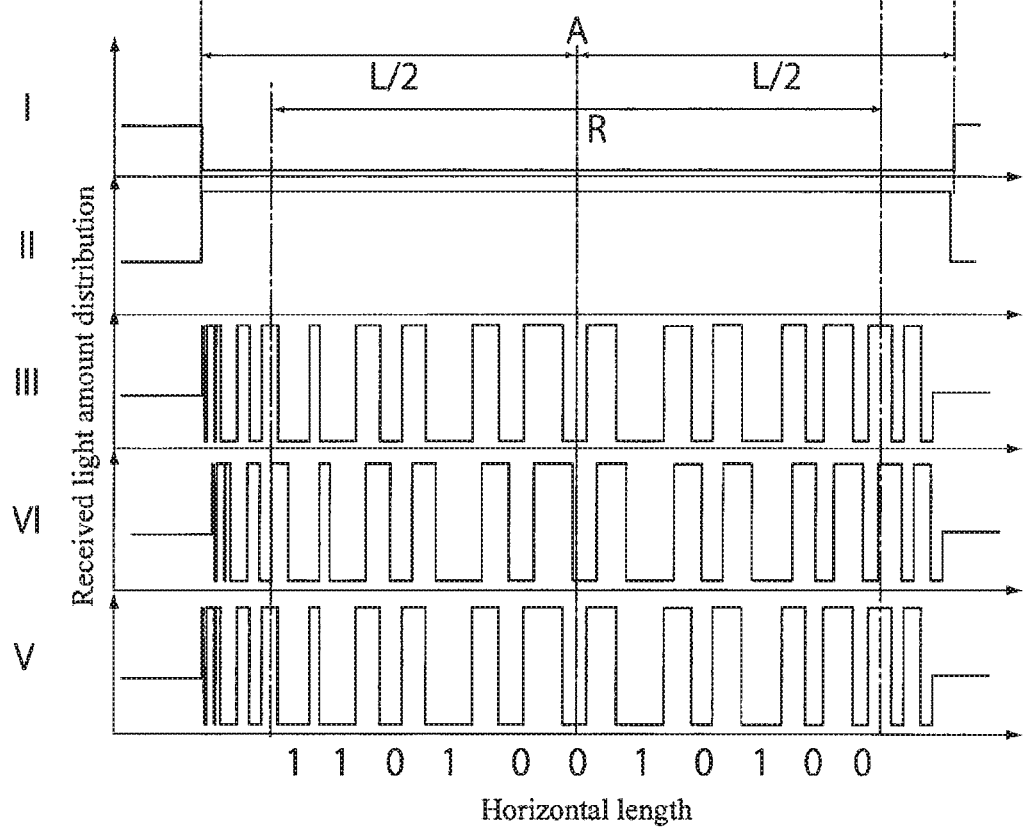
FIG. 12B is a graph illustrating results of output of reflected scanning light as a received light amount distribution.

As a result, in FIG. 12B, it is found that pixel rows I and II correspond to the width information portion 132. Then, from the width L of the encoder pattern 13B detected (diameter of the encoder pattern portion 13), a center position A of the encoder pattern 13B is identified.

Next, in Step S204, the encoder pattern read angle operation unit 58 calculates correlations of received light amount distributions at the respective positions from the received light amount distributions acquired in Step S202, and ones having correlations higher than a predetermined value are extracted as the results of reading of the angle information portion 131.

In the example illustrated in FIG. 12B, at the scanning positions III to V, patterns of the received light amount distributions have high correlations with each other. Therefore, the light received amount distributions at the scanning positions III to V are found to be results of reading of the angle information portion 131.

Then, the extracted received light amount distributions at the scanning positions III to V are added up in the vertical direction, and mean values are calculated. A portion with a calculated mean value smaller than a predetermined threshold is determined as a black portion, and a width of the black portion is obtained. Next, whether the obtained width value corresponds to a narrow width or a wide width of the encoder pattern 13B is determined, and a region with the width determined as a narrow width is read as a bit "0," that is, a vertical line 131$a$, and a region with the width determined as a wide width is read as a bit "1," that is, a vertical line 131$b$.

By calculating received light amount distributions as mean values of the plurality of positions in this way, for example, as in the case of the scanning position IV, even when noise such as misalignment in the horizontal position of a received light amount distribution occurs, the influence of this misalignment can be reduced, and reading accuracy can be improved.

The encoder pattern portion 13 is columnar, so that the vertical line widths $w_1$ and $w_2$ and the pitch p are observed to be narrower than actual widths with increasing distance from the center. For example, in FIG. 3A, the width $w_{2a}$ of the wide-width vertical line 131$b_1$ near the center is observed to be equal to the width (actual width) $w_2$ of the wide-width vertical line 131$b$ illustrated in the developed view of FIG. 3B. On the other hand, the width web $w_{2b}$ of the wide-width vertical line 131$b_2$ farthest from a central portion is observed to be narrower than the actual width $w_2$. The same applies to the width $w_1$ and the pitch p. Therefore, it is preferable that the widths $w_1$ and $w_2$ are set so that ranges of changes in widths $w_1$ and $w_2$ do not overlap each other in consideration of the influence in which an observed width changes according to disposition.

Next, in Step S205, the encoder pattern read angle operation unit 58 calculates an encoder pattern read angle $\theta_E$ by comparing a bit pattern included in a predetermined width R extending to the left and the right from a center set at the center position A of the encoder pattern 13B obtained in Step S203, that is, a bit pattern represented by a predetermined bit number of vertical lines (for example, 10 lines. Representing a bit pattern "11010010100" in the illustrated example) included in the region of the predetermined width R, with the correlations between bit patterns and angles stored in the storage unit 38. Next, the processing shifts to Step S107.

6. Modification

The above-described embodiment can be modified as follows.

For example, the encoder pattern 13B is not limited to a black and white pattern, and may be formed of a combination of colors with clear contrast. In addition, it is also possible that the encoder pattern is configured as an encoder pattern identifiable not just by visible light but by polarized light and a polarizing filter is provided on an optical path of the encoder pattern reading light receiving unit so as to enable recognition of the pattern.

It is also possible that, in place of the encoder pattern reading unit, a camera is provided, and a peripheral image of the encoder pattern 13B is imaged, and from a pattern of pixel values of the image, the encoder pattern is read.

Embodiments of the present invention are described above, and the above-described embodiments are just examples, and can be combined based on knowledge of a person skilled in the art. The above-described embodiments can be variously changed without departing from the spirit of the invention. As a matter of course, the scope of rights of the present invention is not limited to the above-described embodiments.

REFERENCE SIGNS LIST

10 Target unit
11 Reflection target
13B Encoder pattern
30 Scanner device
31 Distance measuring unit
32 Encoder pattern reading unit
35 Vertical angle detector (angle detector)
37 Horizontal angle detector (angle detector)
42 Arithmetic control unit
63 Scanning unit
70 Leveling base
100 Surveying system

What is claimed is:

1. A surveying system comprising:
a target unit including a reflection target and an encoder pattern showing an angle in a circumferential direction around a central axis of the target unit;

a scanner device including
  a distance measuring unit configured to perform a distance measurement by transmitting distance measuring light and receiving reflected light,
  a scanning unit configured to rotationally irradiate the distance measuring light onto a measurement range, and
  an angle detector configured to detect an irradiation direction of the distance measuring light,
so as to acquire point cloud data and acquire measured coordinates of the reflection target by performing target scanning, the scanner device including
  an encoder pattern reading unit configured to optically read the encoder pattern, and
  an arithmetic control unit configured to operate an encoder pattern read angle based on a result of encoder pattern reading; and a leveling base configured to selectively allow either of the target unit and the scanner device to be removably mounted so as to share a central axis in a vertical direction, and having offset angles, being known, around the central axis with respect to each of the target unit and the scanner device when the target unit or the scanner device is mounted, wherein the arithmetic control unit is configured to calculate a direction angle of the leveling base based on the encoder pattern read angle of the target unit installed by mounting on the leveling base and the offset angle of the target unit, and calculate coordinates of an installation point of the target unit based on the measured coordinates of the reflection target of the target unit installed by mounting on the leveling base and the direction angle, and the arithmetic control unit is configured to calculate a direction angle of the scanner device based on the offset angle of the scanner device and the direction angle of the leveling base on which the scanner device is mounted.

2. A surveying method comprising the steps of:
(a) a scanner device calculating a direction angle of the scanner device based on an offset angle $\theta_S$ of the scanner device around a vertical central axis with respect to a leveling base, the scanner device mounted on the leveling base installed at a position $P_i$ whose coordinates and direction angle are known;
(b) the scanner device scanning, at the point $P_i$, a reflection target of a target unit mounted on the leveling base installed at a point $P_{i+1}$ to be observed next, and operating measured coordinates of the reflection target;
(c) the scanner device reading an encoder pattern of the target unit installed at the point $P_{i+1}$, and operating an encoder pattern read angle $\theta_E$ based on a result of reading;
(d) the scanner device operating a direction angle of the leveling base at the point $P_{i+1}$ based on the encoder pattern read angle $\theta_E$ and an offset angle $\theta_T$ of the target unit around the vertical central axis with respect to the leveling base;
(e) the scanner device operating coordinates of the point $P_{i+1}$ based on the direction angle of the leveling base at the $P_{i+1}$ and the measured coordinates;
(f) the scanner device moving the scanner device to the point $P_{i+1}$ whose coordinates and direction angle became known through the steps (a) to (e), when there is a point to be observed next; and
(g) the scanner device repeating the steps (a) to (e) by setting i=i+1 after the step (f), wherein the target unit is configured to include the reflection target and the encoder pattern, the encoder pattern shows an angle in a circumferential direction around the central axis of the target unit, the leveling base is configured to selectively allow either of the target unit and the scanner device to be removably mounted so as to share a central axis in the vertical direction, and the offset angle of the target unit and the offset angle of the scanner device are respectively known.

3. A surveying method comprising:
(h) a step, of the scanner device acquiring point cloud data of a measurement range,
at a point whose coordinates and direction angle became known by using the surveying method according to claim 2.

* * * * *